(12) United States Patent
Otsuki et al.

(10) Patent No.: US 8,219,992 B2
(45) Date of Patent: Jul. 10, 2012

(54) DATA PROCESSING SYSTEM HAVING A PLURALITY OF PROCESSORS AND OPERATING SYSTEMS

(75) Inventors: Norimasa Otsuki, Tokyo (JP); Yasuhiko Saito, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1160 days.

(21) Appl. No.: 11/970,505

(22) Filed: Jan. 7, 2008

(65) Prior Publication Data
US 2008/0184243 A1 Jul. 31, 2008

(30) Foreign Application Priority Data
Jan. 31, 2007 (JP) ................... 2007-021123

(51) Int. Cl.
*G06F 9/46* (2006.01)
(52) U.S. Cl. ........................................ 718/102
(58) Field of Classification Search .................. None
See application file for complete search history.

(56) References Cited

U.S. PATENT DOCUMENTS

| | | | |
|---|---|---|---|
| 6,931,640 B2 | 8/2005 | Asano et al. | |
| 7,205,881 B2 * | 4/2007 | Reed et al. | 340/2.24 |
| 7,536,689 B2 * | 5/2009 | Mangan | 718/100 |
| 2004/0019618 A1 * | 1/2004 | Oyama et al. | 708/250 |
| 2004/0064746 A1 | 4/2004 | Nishimoto et al. | |
| 2005/0060704 A1 | 3/2005 | Bulson et al. | |
| 2005/0149933 A1 * | 7/2005 | Saito et al. | 718/100 |

FOREIGN PATENT DOCUMENTS

| | | |
|---|---|---|
| JP | 8-328935 A | 12/1996 |
| JP | 2001-331333 A | 11/2001 |
| JP | 2007-506169 A | 3/2007 |
| WO | WO 02/061591 A1 | 8/2002 |

* cited by examiner

*Primary Examiner* — Emerson Puente
*Assistant Examiner* — Gregory Kessler
(74) *Attorney, Agent, or Firm* — Miles & Stockbridge P.C.

(57) ABSTRACT

Management programs for concealing differences in hardware configuration and OS are operated and stayed resident every OS. A database manipulated by the management programs is prepared. The database defines correspondences between tasks for hardware control and software processing, which are processed under the control of the OSs and their attached OSs, over the OSs. When the corresponding management program detects a startup request of a task, the management program extracts an entry corresponding to the task from the database. If an attached OS owned by the extracted entry is its own OS, then the task is processed under the control of the corresponding OS. If the attached OS owned by the extracted entry is other OS, then the startup request is passed to a processor of the other OS, where the task is processed.

20 Claims, 5 Drawing Sheets

DATA PROCESSING SYSTEM HAVING A PLURALITY OF PROCESSORS AND OPERATING SYSTEMS

CROSS-REFERENCE TO RELATED APPLICATIONS

The disclosure of Japanese Patent Application No. 2007-21123 filed on Jan. 31, 2007 including the specification, drawings and abstract is incorporated herein by reference in its entirety.

BACKGROUND OF THE INVENTION

The present invention relates to a data processing system using a plurality of OS (Operating Systems) and a plurality of processors, and to, for example, a technology effective if applied to an LSI (Semiconductor Integrated Circuit) of a system-on-chip (SOC) in which a plurality of processors and peripheral circuit devices are on-chipped.

With an increase in application scale required of one data processing system, a system configuration that treats functions of a plurality of processors in a comprehensive manner has been used as in the case of an LSI of an SOC having a multiprocessor chip or a multiprocessor, and the like. Such a system needs to comprehensively control or manage a plurality of processors, peripheral input/output circuits and a memory that constitutes the system. When each processor operated under the control of one OS wants each processor operated under the control of other OS to process a specific task, they must carry out communications therebetween. A procedure like an RPC (Remote Procedure Call) can be used in interprocessor communications at a multiprocessor system. A file system using the RPC is illustrated by an example in a patent document 1 (Japanese Patent Laid-Open No. Hei 8 (1996)-328935). A patent document 2 (International Patent Publication No. 02/061591 pamphlet) has described such an interprocessor communication technology that a CPU of one chip of a plurality of data processor chips is accessible to an internal peripheral circuit device of the other chip thereof.

SUMMARY OF THE INVENTION

If the procedure of the RPC is utilized, then a software developer needs not to describe a communication protocol. However, the software developer must specify each processor that carries out communications on application programs, and individually demonstrate their communications using the RPC. It is difficult to adapt to communications between different OSs by means of the RPC. In order to carry out communications between processors operated under the different OSs, programs must be individually described so as to satisfy APIs (Application Program Interfaces) related to both OSs. The API means a protocol that defines or sets up a set of instructions and functions usable when software intended for a platform of a given OS is developed, and further a procedure on each program for using the same.

Thus, the software designer needs to describe a communication portion consciously in order to carry out interprocessor communications. Therefore, software for performing communications and control between different processors becomes complex, thus leading up to an increase in software development cost. With an increase or decrease in the number of processors and peripheral circuit devices that constitute a system, there is a need to re-describe software of a portion for controlling interprocessor communications. Hence software portability is degraded. Since a unified RPC protocol does not exist upon carrying out communications between different types of OSs, there is a need to newly develop a special RPC protocol.

An object of the present invention is to realize a data processing system capable of carrying out interprocessor communications high in flexibility under a data processing environment in which a multi-OS and a multiprocessor are mixed.

Another object of the present invention is to realize a data processing system which reduces the development cost of software that carries out interprocessor communications under a data processing environment in which a multi-OS and a multiprocessor are mixed.

A further object of the present invention is to realize a data processing system which reduces the porting cost of software that carries out interprocessor communications under a data processing environment in which a multi-OS and a multiprocessor are mixed.

A still further object of the present invention is to provide a data processing system capable of performing task processing comparable to the use of specific hardware even with respect to an unavailable state of the specific hardware under a data processing environment in which a multi-OS and a multiprocessor are mixed.

The above, other objects and novel features of the present invention will become apparent from the description of the present specification and the accompanying drawings.

Summaries of representative ones of the inventions disclosed in the present application will be explained in brief as follows:

In a data processing system having a multiprocessor and operable by a plurality of OSs, management programs for concealing differences in hardware configuration and OS are operated and stayed resident every OS. A database manipulated by the management programs is prepared. The database defines correspondences between tasks for hardware control and software processing, which are processed under the control of the OSs and their attached OSs, over the OSs. When the corresponding management program detects a startup request of a task, the management program extracts an entry corresponding to the task from the database. If the attached OS owned by the extracted entry is its own OS, then the task is processed under the control of the corresponding OS. If the attached OS owned by the extracted entry is other OS, then the startup request is passed to a processor of the other OS, where the task is processed. According to it, a procedure call to other OS is realized or implemented in a shared form saying communication made between processors each of which executes a management program. A software designer may describe software without concern for the occurrence of communications between OSs. Software may not be changed one by one with respect to a change in hardware such as a peripheral circuit device and the like of the data processing system. Changing entry data of the management database makes it possible to cope with the portion related to the OS-to-OS communications. Even in the case of communications between different OSs, there is no need to have a consciousness of a communication protocol. It is also easy to make software porting between the different OSs.

Database entries corresponding to a task for performing hardware control and a task for performing processing of such a task by software processing are prepared. If the database entries corresponding to both task are extracted based on the corresponding management program when the startup of the former task is requested, then the latter database entry is made available to the corresponding management program of its attached OS even when an inability to use hardware is detected from the former database entry. Thus, it is possible to realize the processing of the task for performing the hardware control by software in place of the task for performing the hardware control. Even in a state in which some hardware are kept in an operation halt state for low power consumption, task processing comparable to processing using the hardware can be realized by software. It is possible to realize low power consumption of the data processing system without sacrificing the functions of the system.

Representative ones of the inventions disclosed in the present application will be explained in brief as follows:

A data processing system in which a multi-OS and a multiprocessor are mixed, enables interprocessor communications high in flexibility.

In a data processing system in which a multi-OS and a multiprocessor are mixed, the development cost of software that carries out interprocessor communications is reduced.

In a data processing system in which a multi-OS and a multiprocessor are mixed, the porting cost of software that carries out interprocessor communications is reduced.

In a data processing system in which a multi-OS and a multiprocessor are mixed, task processing comparable to the use of specific hardware can be done even with respect to an unavailable state of the specific hardware.

DETAILED DESCRIPTION OF THE PREFERRED EMBODIMENTS

1. Summary of Embodiment

Figure 1:
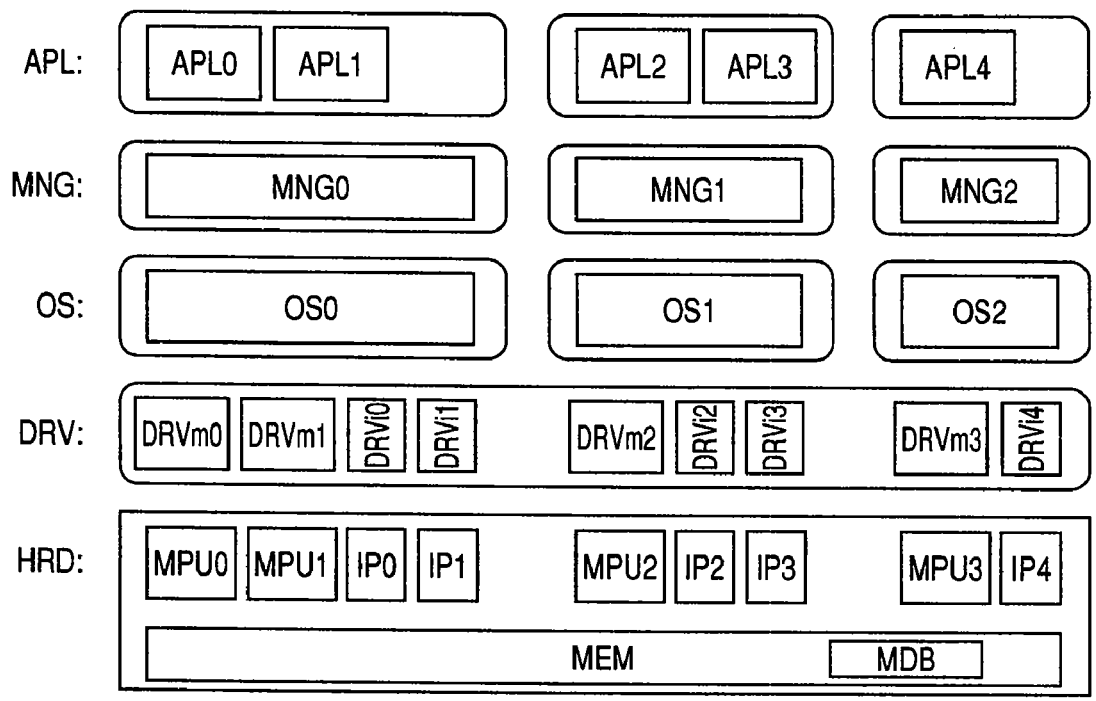
FIG. 1 is a system configuration diagram illustrating by an example, a software configuration of a data processing system according to the present invention.

A summary of a typical embodiment of the present invention disclosed in the present application will first be explained. Reference numerals in the drawings referred to the description of the summary thereof with parentheses applied thereto merely illustrate ones contained in the concepts of constituent elements respectively marked with the reference numerals.

[1] A data processing system according to the typical embodiment of the present invention is of a system that uses a plurality of OSs and a plurality of processors. The data processing system includes a database (MDB) in which correspondences between tasks processed under the control of the OSs and their attached OSs are defined over the OSs, and management programs (MNG0 through MNG2) operated every OS. When a startup of the task is requested, the processor that executes one management program retrieves database entries corresponding to the task from the database. When an attached OS of the database entry selected by the retrieval is an attached OS of the one management program, the processor processes the task under the control of the corresponding attached OS. When the attached OS of the selected database entry is an attached OS of another management program, the processor passes necessary information, for example, information about the selected database entry and information corresponding to the startup request of the task to a processor that executes another management program, and processes the task under the control of the attached OS of another management program.

According to the above means, a procedure call from the OS side subjected to a startup request of a task to other OS side is realized in a shared form saying communication made between processors each of which executes a management program. A software designer may describe software without concern for the occurrence of communications between OSs. Software may not be changed one by one with respect to a change in hardware such as a peripheral circuit device and the like of the data processing system. Changing entry data of a management database makes it possible to cope with a portion related to the OS-to-OS communications. Even in the case of communications between different OSs, there is no need to have a consciousness of a communication protocol therefor. It is also easy to make software porting between the different OSs.

The processors may be formed in a single chip or plural chips.

<<Interactive Communication>>

As one specific form, the processor that executes the one management program is capable of interactive communication with the processor that executes another management program. Primitively, the processor can accept the result of a task processed on the other OS side from the OS side subjected to a task's startup request.

<<Structure of Database Entry>>

As another specific form, the database entries respectively include areas which respectively store therein global task IDs for distinguishing a plurality of tasks of a plurality of OSs from one another respectively, global task names, attached OSs of the tasks, task IDs of the tasks allocated by the attached OSs, and execution statuses of the tasks. The areas that store the task IDs and the task's execution statuses therein respectively are areas rewritable by the management programs. Thus, each management program is capable of dynamically grasping the state of the system from the rewritable areas each indicative of the execution status of the task and controlling whether processing of a startup-requested task is passed to the corresponding management program of any deliverable OS.

Each of the database entries may further include an area for storing therein task protection information that restricts a task execution environment. For example, the protection information is such a restriction that it does not answer a processing request issued from other than the attached OS or answers only a processing request issued from a specific OS.

The database entries may further include areas for storing therein buffer size information that define buffer sizes used in the interactive communication. It is possible to prevent overflow or missing of the information used in the interactive information before it happens.

<<Initialization of Database>>

As a further specific form, the processor executes the corresponding management program under each OS started up in response to initialization instructions of the system thereby to set initialization of a variable area of the database. Each management task processed by its corresponding management program is defined as a resident task and resides in the corresponding processor operated under the OS. Thus, execution statuses of the respective processors subjected to the control of OSs corresponding to the respective management programs, and local task IDs are initially set with respect to the variable area of the database. Since each management program is operated as the resident task, the trouble of starting up the management program each time a task's startup is requested is saved, and immediate responsivity is provided.

The management program operated every OS updates variable areas of database entries to which the OS belongs. When the operation of a processor or peripheral circuit device placed under the control of a specific OS is stopped in a low power consumption mode of the data processing system, an area indicative of an execution status for a database entry, which is associated with a task executed using it, is rewritten into "inoperable".

<<Retrieval Key>>

The global task names correspond to task names respectively. Each processor that executes the management program retrieves the database with, for example, the global task name as a retrieval key. Different tasks of the same kind at each attached OS are assumed to exist in plural form with respect to a task to which its startup is requested. If the same global task name is attached to the tasks and they are given individual global tasks IDS, then each task most suitable for data processing can be started up by utilizing the attached OS, task protection information and execution status as decision factors for selecting the database entries related to the tasks of the same sort.

<<Priority>>

The database entries further have areas for storing priorities therein respectively. The priorities designated at the priority storage areas are different between a plurality of database entries different in global task ID and identical in global task name. The priority can be utilized as one of the decision factors.

For example, each processor that executes the management program may select a database entry highest in priority, which is specified in priority storage areas, where operable tasks exist in plural form when the plural database entries are selected by the retrieval.

<<Soft Substitution>>

Among a plurality of tasks specified within database entries different in global task ID and identical in global task name, one task is set as such a task that hardware-based processing that other task utilizes is substituted with processing based on software of the corresponding processor. When the operation of hardware such as a peripheral circuit device, a processor or the like that the other task utilizes is made inoperable, for example, information of "execution status=inoperable" is reflected on its corresponding database entry associated with the task. Even in such a case, such a task that hardware-based processing is substituted with processing based on software of a processor can be started up. In brief, when hardware such as a specific processor and a peripheral circuit device or the like are inoperable due to trouble and a low power-consumption mode or the like, a task based on software processing can be started up as an alternative to a task for its hardware processing.

<<Alternative Hard>>

Among a plurality of tasks specified within database entries different in global task ID and identical in global task name, one task and other task are made different in attached OS. Preparing programs defining processing based on the tasks in response to different OSs in advance makes it possible to cause other processors different in attached OS to process other tasks corresponding to the processing even when a processor that executes one task is made inoperative. In brief, when a specific processor is inoperative due to trouble and a low power-consumption mode or the like, similar task processing can be allocated to another processor different in attached OS.

[2]<<Soft Substitution>>

A data processing system according to another aspect is a system using a plurality of OSs and a plurality of processors. The data processing system has a database in which correspondences between tasks processed under the control of the OSs and their attached OSs are defined over the OSs, and management programs operated every OS. The database entries respectively include areas which respectively store therein global task IDs for distinguishing a plurality of tasks of a plurality of OSs from one another respectively, global task names, attached OSs of the tasks, task IDs of the tasks allocated by the attached OSs, execution statuses of the tasks, and priorities of the tasks. Among a plurality of tasks specified within database entries different in global task ID and identical in global task name, one task is of such a task that hardware-based processing that other task utilizes is substituted with processing based on software of the corresponding processor. When a startup of the task is requested, the processor that executes one management program retrieves database entries corresponding to the task from the database. When tasks of the database entries selected by the retrieval are the one task and other task, the processor that executes the one management program processes a task highest in priority within operable tasks under the control of the corresponding attached OS.

When a specific processor and its corresponding peripheral circuit device are inoperative due to trouble and a low power consumption mode or the like, a task based on software processing of another processor can be started up in place of a task based on hardware processing thereby. When they are both operable, each task for performing processing by hardware can be started up according to the precedence. The system can be maintained over partial trouble or the like. It is also possible to realize low power consumption of the data processing system without sacrificing the functions of the system.

[3]<<Alternative Hard>>

A data processing system according to a further aspect is of a system using a plurality of OSs and a plurality of processors. The data processing system includes a database in which correspondences between tasks processed under the control of the OSs and their attached OSs are defined over the OSs, and management programs operated every OS. The database entries respectively include areas which respectively store therein global task IDs for distinguishing a plurality of tasks of a plurality of OSs from one another respectively, global task names, attached OSs of the tasks, task IDs of the tasks allocated by the attached OSs, execution statuses of the tasks, and priorities of the tasks. Among a plurality of tasks specified within database entries different in global task ID and identical in global task name, one task and other task are made different in attached OS. When a startup of the task is requested, the processor that executes one management program retrieves database entries corresponding to the task from the database. When tasks of the database entries selected by the retrieval are the one task and other task, the processor that executes the one management program processes a task highest in priority within operable tasks under the control of the corresponding attached OS.

When a specific processor is inoperative due to trouble and a low power consumption mode or the like, equal task processing can be allocated to another processor different in attached OS. When they are both operable, each task for performing processing by hardware can be started up according to the precedence. The system can be maintained over partial trouble or the like. It is also possible to realize low power consumption of the data processing system without sacrificing the functions of the system.

2. Details of Embodiment

A preferred embodiment will next be described in further detail.

Figure 2:
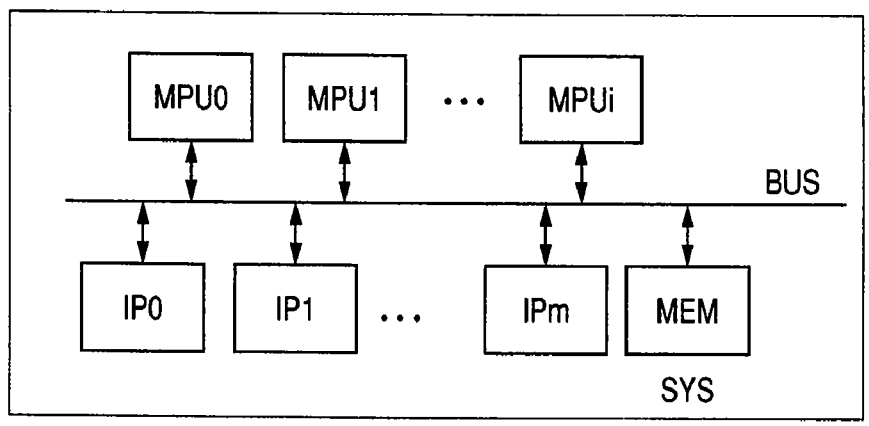
FIG. 2 is a hardware block diagram illustrating by an example, hardware of a data processing system according to the present invention.

FIG. 2 is a hardware block diagram of a data processing system according to the present invention. The data processing system SYS shown in the same drawing includes a plurality of typically-illustrated processors MPU0 through MPUi, peripheral circuit devices IP0 through IPm and a memory MEM. They are coupled to an internal bus BUS. A configuration of the internal bus BUS is not limited in particular. The internal bus BUS may be a split transaction bus or may be a bus on which arbitration is executed by exclusive access control. Each of the peripheral devices IP0 through IPm may be any of a DMAC (Direct Memory Access Controller), an SCI (Serial Communication Interface), an LCD (Liquid Crystal Driver), a VIO (Video Input/Output circuit), a GRF (Graphic processor), a MEMCNT (Memory Controller), a DSP (Digital Signal Processor), a TMR (Timer counter) and the like.

Each of the processors MPU0 through MPUi includes at least a central processing unit and is equipped with an address translation buffer, a cache memory and other logic circuits according to need. Although not restricted in particular, the processors MPU0 through MPUi respectively execute application programs (user programs) under different OSs. The present data processing system is a system of a multi-OS/multi-processor and is configured as an SOC semiconductor integrated circuit formed of a single chip.

A software configuration of a data processing system SYS according to the present invention is illustrated in FIG. 1 by way of example. FIG. 1 illustrates by an example, a case in which four processors MPU0 through MPU3, five peripheral circuit devices IP0 through IP4 and a memory MEM are provided as hardware (HRD). Although not restricted in particular, software is constituted of an operating system (OS), a management program (MNG), an application program (APL) and driver software (DRV). OS0 through OS2 are used as the operating system that forms the core of the software. Application programs APL0 and APL1 are executed under the control of the operating system OS0. Application programs APL2 and APL3 are executed under the control of the operating system OS1. An application program APL4 is executed under the control of the operating system OS2. Here, each application program is positioned or located as a program module that requires the startup of a user task (also described simply as task). Further, a program module which defines processing of a started-up task is positioned as the driver software. The driver software includes not only one executed to utilize each peripheral circuit device but also a program for defining processing that the corresponding processor exclusively implements or realizes by software alone. In brief, the application program can be positioned as a high-order user program, and the driver software can be positions as a low-order user program. In FIG. 2, DRVi0 through DRVi4 correspond to driver software for processing using the peripheral circuit devices, and DRVm0 through DRVm3 correspond to driver software for processing that the processors exclusively realize by software alone. The driver software DRVm0 through DRVm3 may be a set of a plurality of programs respectively.

One processor is assumed to be started up by each of the operating systems OS0 through OS2 without depending on whether each thereof corresponds to a symmetrical multiprocessor OS for controlling the operations of plural processors or an OS for controlling one processor.

Figure 3:
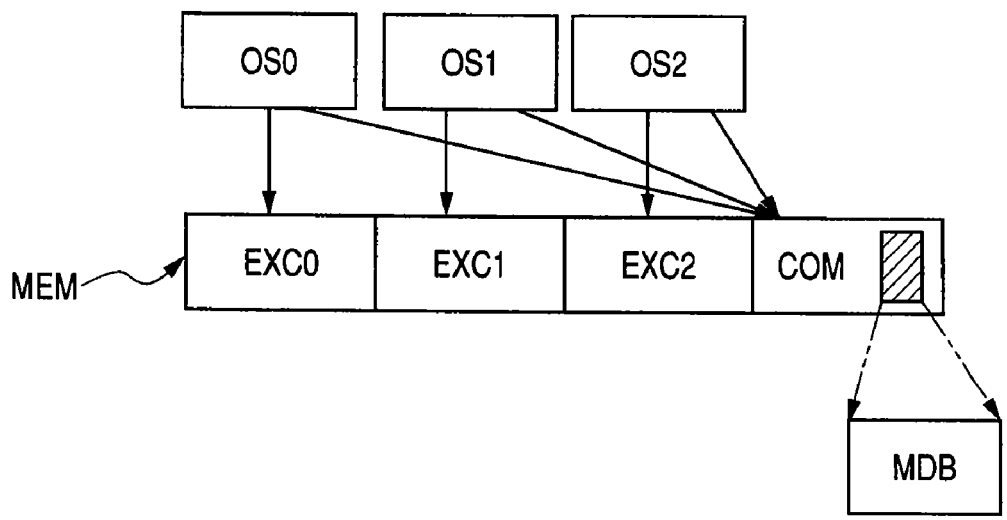
FIG. 3 is an explanatory diagram illustrating by an example, a common area placed on a memory area, which is used as a communication buffer by a management program.

The management programs MNG0 through MNG2 are started or activated under their corresponding operating systems OS0 through OS2. After their startup, they function as resident tasks. When the application programs request the startup of tasks under their corresponding operating systems OS0 through OS2, the management program MNG0 through MNG2 respectively control the startup of the tasks while referring to and operating a management database and in cooperation with one another. The mutual cooperation of the management programs MNG0 through MNG2 enables obscuring of a system's hardware configuration and a difference in OS at the application programs. In order to execute the mutual cooperation, the management programs respectively utilize an addressable common area COM located on a memory MEM as a communication buffer under memory management functions by a plurality of operating systems OS1 through OS3 as illustrated by way of example in FIG. 3. EXC0 through EXC2 are dedicated areas managed by their corresponding operating systems OS1 through OS3. Although not restructured in particular, a management database MDB is formed in the common area COM. The functions of the management programs and the management database will be described below in detail.

Figure 4:
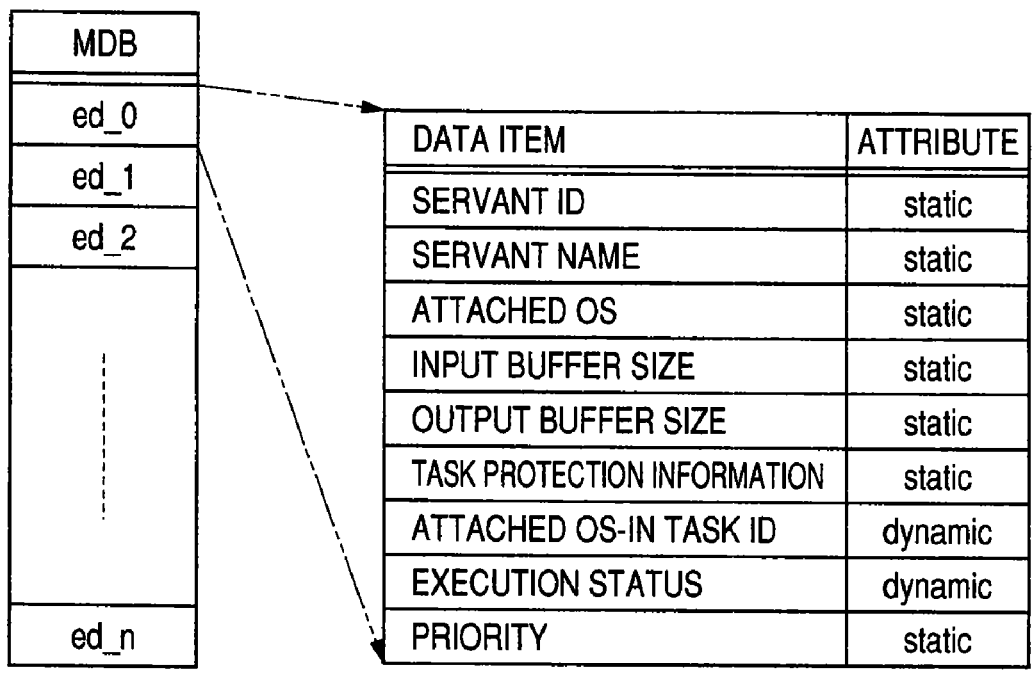
FIG. 4 is a format diagram illustrating by an example, one entry data of a management database.

One entry data of the management database is illustrated by an example in FIG. 4. The management database MDB has a plurality of database entries ed_0 through ed_n. The database entries ed_0 through ed_n respectively define correspondences between tasks for hardware control and software processing processed under the control of OSs and each attached OS, and the like over a plurality of OSs. According to FIG. 4, data items contained in the database entries are as follows. The plural tasks for the plural OSs are respectively referred to as global tasks, i.e., servants and managed at the management database MDB. The servants are placed in a one-to-one correspondence with the tasks and distinguished by servant IDs (global task IDs). The servants are associated with driver software corresponding to processing programs for hardware control and software processing for defining the tasks, every servant ID. In the present specification, each task whose start is requested under the control of each OS is associated with its corresponding servant and driver software via the management program and management database.

Servant names are respectively attached to the servants. Here, the servant name coincides with a task name under the control of each OS. This relation is assumed to have been ensured by referring to the OS and API (Application Program Interface) of each management program in the program development. Even though the servant name is the same, the servant IDs are distinguished from each other. The priority of processes between servants identical in servant name is defined according to data items assigned priorities. Each servant is assigned an attached OS in which its corresponding task is placed under control thereof. The data items related to an input buffer size and an output buffer size means buffer sizes used in communications made between management programs. The corresponding buffer is ensured in the common area COM. Each servant is assigned a task ID (attached OS-in task ID) allocated by its attached OS. The assignment of the attached OS-in task ID is determined only when the attached OS is started up. The servant specifies its execution status. The contents of task management of the corresponding task by the OS are reflected on the data item indicative of the execution status. Date thereof is indicative of whether at least the corresponding hardware processing or software processing is made possible. Accordingly, the data on the execution status is varied depending upon the state of the system. The execution status of a servant that uses hardware whose operation is stopped in a low power-consumption state or hardware inoperable due to a failure is represented as inoperable. While a data entry operation for the data item indicative of the execution status is performed by the management program of the corresponding OS, information to be rewritten is obtained via the OS. The stop of the operation in the low power-consumption state is recognized in accordance with the set contents of a mode register. The state of the hardware being inoperable due to the failure may be grasped using a self check function of a watch dog timer or the like. The database entry has task protection information which restricts a task execution environment. For example, the task protection information is restrictive information that does not answer a processing request issued from other than the attached OS or answers only a processing request issued from a specific OS. When a request issued from an OS free of permission of a processing request to the servant is made, for example, an error is returned to the OS without executing the servant.

Ones other than the attached OS-in task ID and the data item indicative of the execution status are set as fixed values inherent in the servant. Information on all servants managed by the management programs have been registered in the management database. All OSs have a copy of the same management database. Since, however, each data item at which the attribute is dynamic is of information that depends upon the attached OS, only a management program of such an OS is rewritable and other OSs are not capable of rewriting operation. The items at which the attribute is static are of information static over the entire system and are set as information common to all the OSs.

Figure 5:
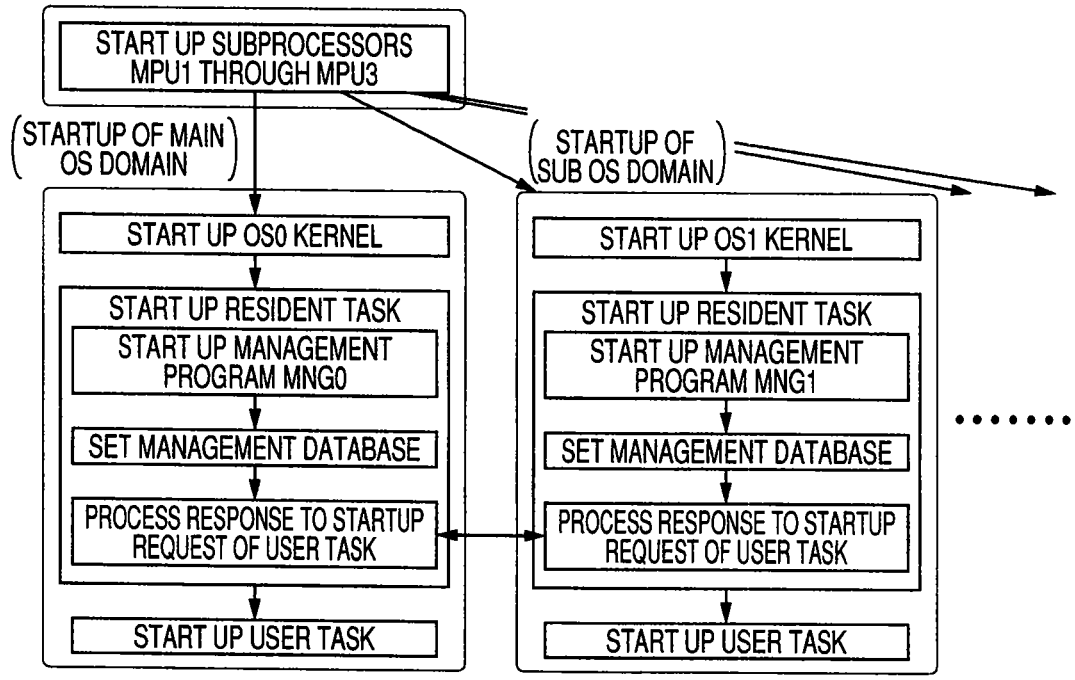
FIG. 5 is a flowchart illustrating by an example, a startup sequence which starts a management program as a resident task.

A startup sequence which starts each management program as a resident task, is illustrated by an example in FIG. 5. Although not restricted in particular, one specific processor MPU0 is set as a start main processor here. A reset signal is supplied to the processor MPU0 such that it is first started. The started main processor MPU0 gives reset instructions to the remaining sub processors MPU1 through MPU3 to start up them. Upon startup of each OS, the resident task of each OS is started up. Here, the management program is started up so that a management database is set by the started-up management program. The data items whose attributes are defined as dynamic at each database entry of the management database MDB disposed in the common area COM are made undefined. Each management program copies the management database MDB kept in this state into its corresponding memory area and sets data about an attached OS-in task ID and an execution status corresponding to the data items whose attributes are defined as dynamic, to their corresponding database entries in database entries of the copied management program, at which attached OSs are taken as their own OSs. Thereafter, the management program performs a process response to a startup request of each user task and executes a necessary user task, within an OS domain.

Figure 6:
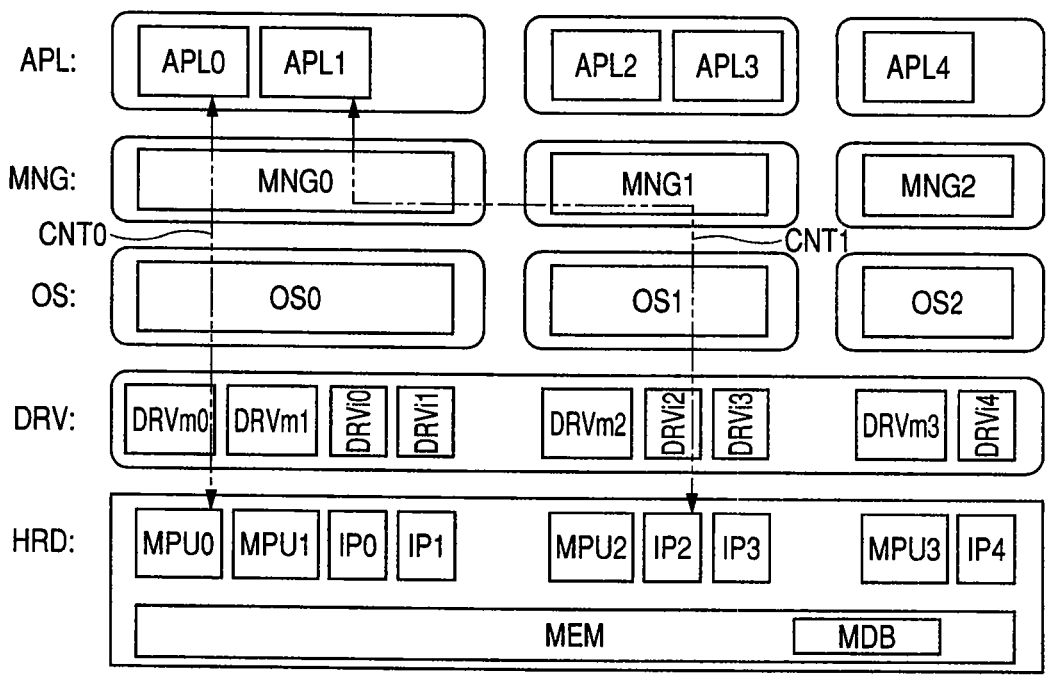
FIG. 6 is an explanatory diagram illustrating by an example, a typical processing system related to processing of answering a start request of a user task.

A typical processing system for a process response to a startup request of a user task is shown in FIG. 6. When a startup request of a user task is made at an OS domain, the corresponding management program refers to a management program on its own OS domain side, i.e., own OS side and retrieves a data entry of a servant name corresponding to its task name. If the attached OS of the retrieved data entry is the same OS as a request source, then the management program carries out a procedure for executing its servant. A processor MPU0 is caused to execute driver software DRVm0 on the OS0 side as indicated by a path of CNT0, for example. On the other hand, if the attached OS of the retrieved data entry is an OS different from the request source, then the management program communicates with a management program of an OS to which its servant belongs, to transmit a startup request of the corresponding user task and requests it to return the result of execution of the user task. At other OS domain to which the request has been transmitted, its management program carries out a procedure for executing a servant corresponding to the startup request by referring to database entries of the servant. As indicated by a path of CNT1, for example, a servant startup request issued from a OS0 domain is delivered to a management program of an OS1 domain, where a processor MPU2 is caused to execute driver software DRVi2 using a peripheral circuit device IP2. The result of its execution is returned from the corresponding management program MNG1 of the OS0 domain to the management program MNG0 of the OS1 domain.

As represented by the answering processes of the above two systems, a procedure call from the OS domain subjected to the startup request of the user task to other OS domains is realized or implemented in a shared form saying communication made between processors each of which executes a management program. Thus, a software designer may describe software like a user program without concern for the occurrence of communications between OSs. Software may not be changed one by one with respect to a change in hardware such as a peripheral circuit device and the like of the data processing system. Changing the entry data of the management database makes it possible to cope with the portion related to the OS-to-OS communications. Even in the case of communications between different OSs substantially, there is no need to have a consciousness of a communication protocol upon the development of each application. Thus, it is also easy to make software porting between the different OSs.

Procedures in the OS domains at the respective answering processing systems will further be explained. The global task names corresponds to task names. Each processor that executes its corresponding management program retrieves data base entries within its OS domain with the global task name as a retrieval key. As to the result of retrieval, different tasks of the same kind at each attached OS are assumed to exist in plural form with respect to a task to which its startup is requested. While the same global task name is attached to the tasks, they are given individual global tasks IDs. By utilizing task protection information and an execution status in addition to the attached OS as decision factors for selecting the database entries related to the tasks of the same sort, each task most suitable for data processing can be started up. For example, the task protection information means such a restriction that it does not answer a processing request issued from other than the attached OS or answers only a processing request issued from a specific OS. Defining such task protection information of servant statically makes it possible to automatically cut or block off a task startup request issued from a permission-free OS and thereby enhance security strength.

By allowing designated or specified priorities to differ between a plurality of database entries different in global task ID and identical in global task name, the corresponding priority can be utilized as one of the decision factors. Where operable tasks exist in plural form when the plural database entries are selected by the retrieval, the processor that executes the management program may be caused to execute a servant for a database entry highest in priority, which is specified in a priority storage area. Further, each management program operated for every OS in the management database MDB updates a data item indicative of an execution status corresponding to a variable area (data item whose attribute is defined as dynamic) in database entries to which its OS belongs. When the operation of a processor or peripheral circuit device placed under the control of a specific OS is stopped in a low power consumption mode of the data processing system, an area indicative of an execution status for a servant's database entry, which is associated with a task executed using the above, is rewritten into "inoperable". The processor that executes the management program passes over execution with respect to each servant indicative of "execution status=inoperable".

Each processor that executes the management program performs, for example, the following procedures on the basis of the execution status and data items based on the priority.

A description will be made of a case in which, for example, such a task that processing of a hardware portion is substituted with software processing, is prepared. This is a case in which among a plurality of tasks specified within database entries different in global task ID and identical in global task name, one task is defined as such a task that hardware-based processing that other task utilizes is substituted with processing based on software of the processor. When the operation of hardware such as a peripheral circuit device, a processor or the like that the other task utilizes is made impossible at this time, information of "execution status=inoperable" is reflected on its corresponding database entry associated with the task. Even when, in such a case, the startup of a task using specific hardware processing is requested or the corresponding hardware is made inoperable, such a task that hardware-based processing is substituted with processing based on software of a processor can be started up. In brief, when hardware such as a specific processor and a peripheral circuit device or the like are inoperable due to trouble and a low power-consumption mode or the like, the task for software processing can be started up as an alternative to the task for its hardware processing. When the operation of the hardware is possible, the priority of a servant that uses the hardware is set higher than the priority of a servant that executes software substitutional processing, thereby making it possible to give priority to the processing using the hardware. Further, even a lower-cost system free of the existence of arbitrary peripheral circuit devices can adapt to no change in software. Cutting off a clock for the corresponding peripheral circuit device based on information about power and restricted time and executing a task with other processor and the corresponding peripheral circuit device enables promotion of a reduction in power consumption of the system.

A description will be made of, as another example, a case in which substantially the same processes are prepared as different tasks at different OS domain. This shows the relationship in which one task becomes preparatory for other tasks. Servants identical to one another in servant name and different in servant ID are prepared in association with such tasks. One servant is set high in priority and other servants are set low in priority. Thus, even when the operation of a processor that executes one task is made inoperative, it is possible to cause other processors different in attached OS to process other tasks corresponding to such processing. In brief, when a specific processor is made inoperative due to trouble and a low power-consumption mode or the like, similar task processing can be allocated to another processor different in attached OS. Since the processing of a necessary task can be executed by another processor when a certain processor has failed, the processing can be carried out continuously without any change in software.

Figure 7:
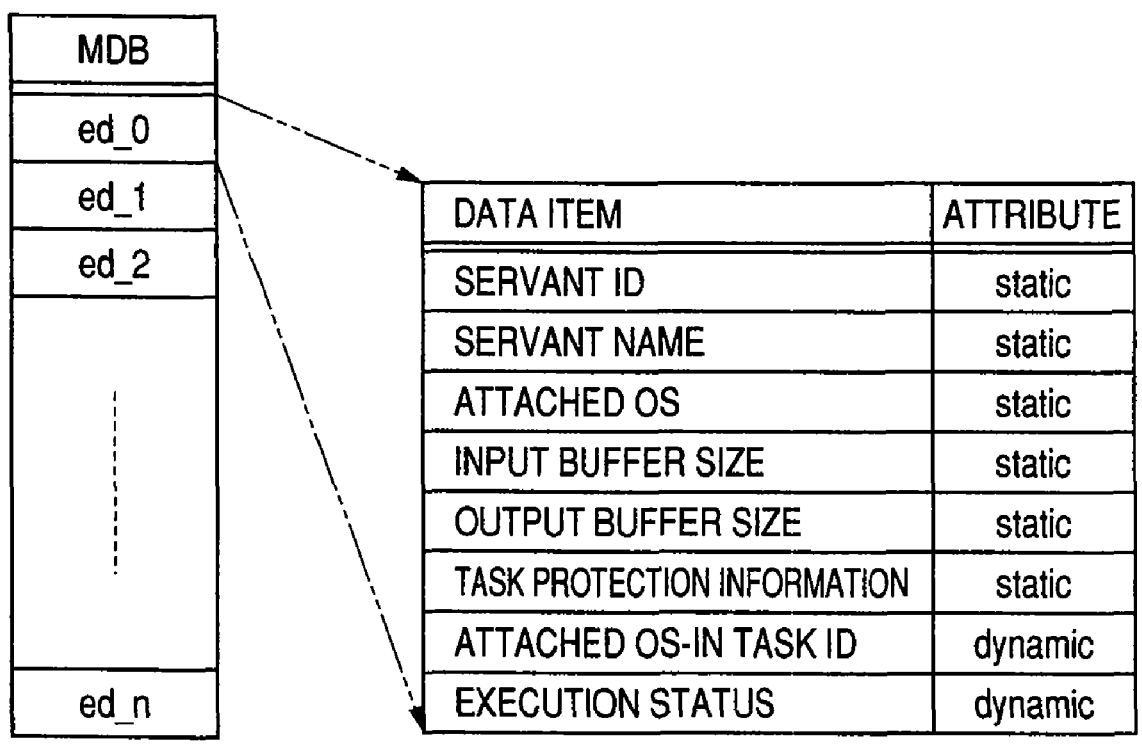
FIG. 7 is a format diagram illustrating by an example, a management database used where task management using the management database is simplified.

A management database used where task management using the management database is illustrated by an example in FIG. 7. FIG. 7 is different from FIG. 4 in that the data items based on the priority are omitted. In this case, a management program retrieves the management database in response to a startup request of a user task using a servant ID as a retrieval key. A plurality of database entries are not hit by the retrieval. While a switch to a task substituted with software and a switch to a task used as alternative to a task that uses hardware being at fault or deactivated are not done, a procedure in each OS domain by the management program is simplified. This is most suitable for a small-scale data processing system and simple control on a data processing system.

Figure 8:
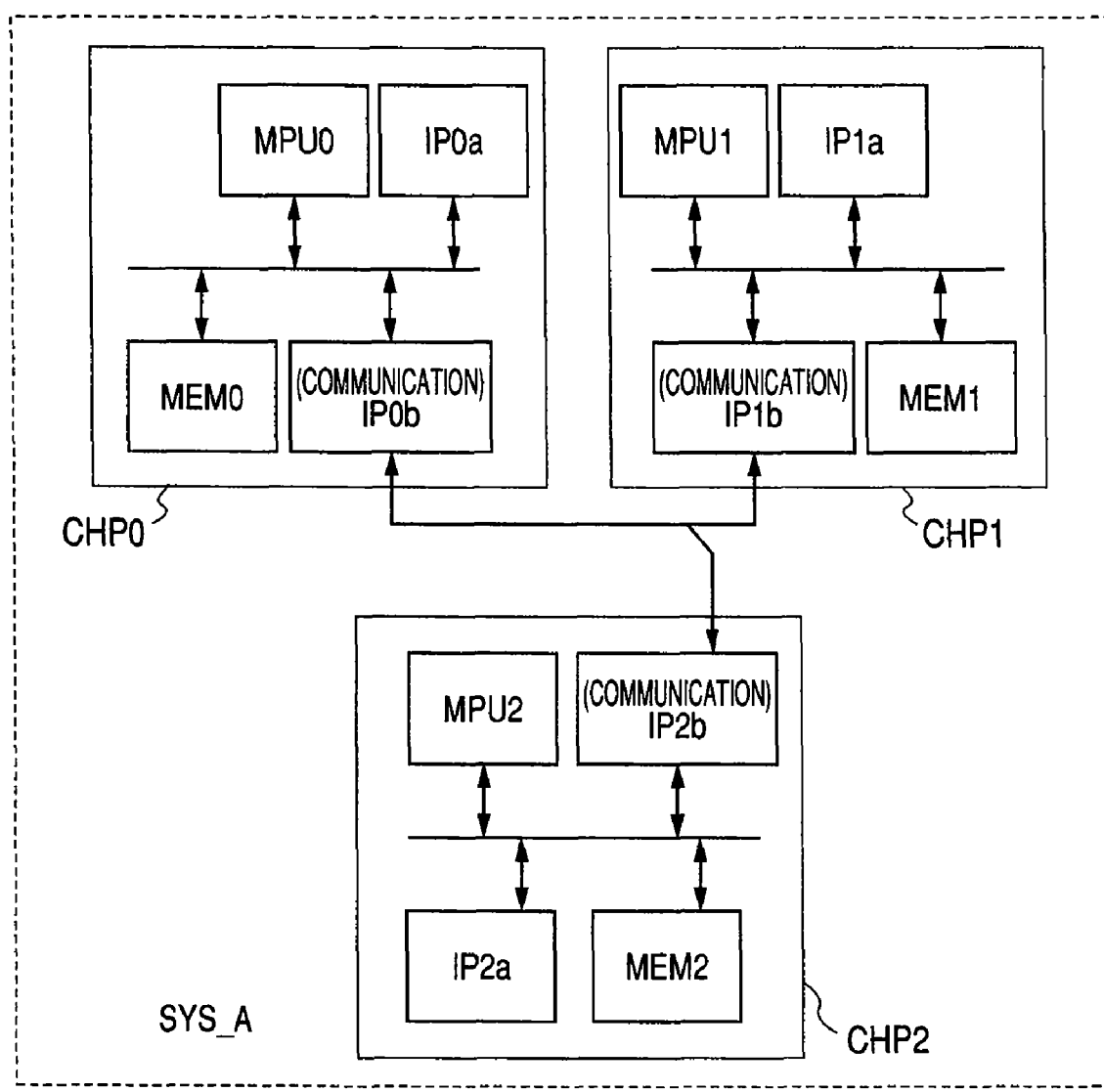
FIG. 8 is a block diagram illustrating by an example, a data processing system constituted of a multichip.

A data processing system constituted of a multichip brought into individual chip form every set of suitable functions is shown in FIG. 8. The data processing system SYS_A has a plurality of semiconductor integrated circuits CHP0 through CHP2. MPU0 through MPU2 indicate processors, MEM0 through MEM2 indicate local memories, IP0$b$, IP1$b$ and IP2$b$ indicate peripheral circuit devices for communication, and IP0$a$, IP1$a$ and IP2$a$ indicate other peripheral circuit devices, respectively. While communications by the communication peripheral circuit devices IP0$b$, IP1$b$ and IP2$b$ are realized or implemented using a communication protocol such as serial, TCP/IP or the like, processing for the communications can be concealed or hidden from an application program as communications made between resident tasks by the corresponding management program. Upon creation of each application program, there is no need to have a consciousness of a system configuration for its communication. Similar effects can be obtained regardless of whether a multichip processor configuration of a multi-OS is an on chip or an off chip. When no shared memory is provided as shown in FIG. 8, it is necessary that a processor of one semiconductor integrated circuit used as the main passes a copy of a management database to a processor of another semiconductor integrated circuit in response to power on reset or the like.

According to the data processing system referred to above, the following operative effects can be obtained.

(1) Since a procedure for a task call between OSs is automatically performed between resident tasks by a management program, a software designer is able to describe software without having a consciousness of the occurrence of communications between the OSs.

(2) Even though hardware configurations such as the number of peripheral circuit devices, attached OSs of the peripheral circuit devices, and the like are changed, the resident task automatically retrieves the affiliation of driver software for each peripheral circuit device. It is therefore unnecessary to modify software in association with an application program with respect to the application program. In order to adapt to a change in hardware configuration, a management database may be updated.

(3) Since reference to and control on the management database are shared between all OSs, it is not necessary to have a consciousness of communications between different types of OSs even in the case of the communications therebetween. Software porting between the different types of OSs becomes also easy.

(4) When a processor and a peripheral circuit device are at fault, substitution for processing of a necessary task can be done using another processor and peripheral circuit device. It is therefore possible to continue the processing without any change in software.

(5) Since processing using hardware can be substituted with processing based on software, software such as a user program or the like can be executed without its change even where a lower-cost data processing system free of the existence of processors and peripheral circuit devices is provided.

(6) When the supply of a synchronous clock and an operating power supply to a processor and a peripheral circuit device is cut off according to a sleep mode and a standby mode or the like, this state is reflected on a data item indicative of an execution status and can be substituted for processing of a task using another processor and peripheral circuit device. It is therefore possible to achieve low power consumption of a data processing system without causing function degradation.

While the invention made above by the present inventors has been described specifically on the basis of the preferred embodiment, the present invention is not limited to the embodiment referred to above. It is needless to say that various changes can be made thereto without the scope not departing from the gist thereof.

For example, the attributes of data items in a management database are all defined as dynamic and may be made rewritable by the corresponding management program. However, the management database needs to be identical between respective OSs. Therefore, when an attached OS of each servant and protection information are changed, it is necessary to temporarily stop resident task operations of all OSs, perform update processing of the management database with respect to all OS domains and assure coherency. While the attached OS of the servant and the protection information can be changed and the flexibility of a system configuration becomes high, security strength might be degraded. The type of OS and architecture of a processor both adoptable in a data processing system of the present invention are not limited and suitably selectable.

What is claimed is:

1. A data processing system, comprising:
a plurality of processors configured to execute a plurality of operating systems (OSs);
a database having a plurality of database entries each defining a correspondence between a task and an attached OS,
wherein said OSs are configured to operate a plurality of management programs,
wherein when a startup of a task is requested, a first processor of said plurality of processors that executes a first one of the management programs under control of a first one of the OSs, retrieves a database entry corresponding to said requested task from the database and determines whether the attached OS of the database entry selected by the retrieval is said first one of the OSs,
wherein when said attached OS of the selected database entry is said first one of the OSs, the first processor processes a task defined by the selected database entry under the control of said first one of the OSs, and
wherein when the attached OS of the selected database entry is a second one of the OSs configured to operate a second one of the management programs, the first processor passes necessary information to a second processor of said plurality of processors that executes said second one of the management programs and said second processor processes said task defined by the selected database entry under the control of the second one of the OSs.

2. The data processing system according to claim 1, wherein the first processor that executes the first one of the management programs is capable of interactive communication with the second processor that executes said second one of the management programs.

3. The data processing system according to claim 2, wherein the database entries respectively include areas which respectively store therein global task IDs for distinguishing a plurality of tasks of a plurality of OSs from one another respectively, global task names, attached OSs of the tasks, task IDs of the tasks allocated by the attached OSs, and execution statuses of the tasks, and
wherein the areas that store the task IDs and the task's execution statuses therein respectively are areas rewritable by the management programs.

4. The data processing system according to claim 3, wherein each of the database entries further includes an area for storing therein task protection information which restricts a task execution environment.

5. The data processing system according to claim 4, wherein the database entries further include areas for storing therein buffer size information which define buffer sizes used in the interactive communication.

6. The data processing system according to claim 3, wherein a processor executes the corresponding management program under the OS started up in response to initialization instructions of the system thereby to set initialization of a variable area of the database, and each management task processed by its corresponding management program is defined as a resident task and resides in the corresponding processor operated under the OS.

7. The data processing system according to claim 6, wherein the management programs update variable areas of database entries to which the OS belongs.

8. The data processing system according to claim 3, wherein the global task names correspond to task names respectively, and each said processor that executes the management program retrieves the database with the task name as a retrieval key.

9. The data processing system according to claim 8, wherein the database entries further have areas for storing priorities therein respectively, and
wherein the priorities designated at the priority storage areas are different between a plurality of database entries different in global task ID and identical in global task name.

10. The data processing system according to claim 9, wherein said each processor that executes the management program selects a database entry highest in priority, which is specified in priority storage areas, where operable tasks exist in plural form when the plural database entries are selected by the retrieval.

11. The data processing system according to claim 10, wherein among a plurality of tasks specified within database entries different in global task ID and identical in global task name, a first task is defined as a task that utilizes hardware-based processing and a second task is defined as task that substitutes the hardware-based processing of first task with processing based on software of the corresponding processor.

12. The data processing system according to claim 10, wherein a first task and a second task are different in attached OS among a plurality of tasks specified within said database entries different in global task ID and identical in global task name.

13. The data processing system according to claim 2, wherein at least said first and said second processors of said plurality of processors are formed in a single chip.

14. The data processing system according to claim 2, wherein at least said first and said second processors of said plurality of processors are formed in a plurality of chips, respectively.

15. A data processing system, comprising:
- a plurality of processors configured to execute a plurality of operating systems (OSs);
- a database having a plurality of database entries each defining a correspondence between a task and an attached OS,
- wherein said OSs are configured to operate a plurality of management programs,
- wherein the database entries respectively include areas which respectively store therein global task IDs for distinguishing a plurality of tasks of a plurality of OSs from one another respectively, global task names, attached OSs of the tasks, task IDs of the tasks allocated by the attached OSs, execution statuses of the tasks, and priorities of the tasks, each said database entry having distinct areas separately storing the global task ID and the global task name,
- wherein among a plurality of tasks specified within database entries different in global task ID and identical in global task name, a first task is defined as a task that utilizes hardware-based processing and a second task is defined as a task that substitutes the hardware-based processing of the first task with processing based on software of the corresponding processor,
- wherein when a startup of a task is requested, the processor that executes one of the management programs retrieves a plurality of database entries corresponding to the requested task from the database, and
- wherein when tasks of the database entries selected by the retrieval are said first task and said second task, the processor that executes the one management program processes a task highest in priority within operable tasks under the control of the corresponding attached OS.

16. The data processing system according to claim 15, wherein the global task names correspond to task names respectively, and each said processor that executes one or more of the management programs retrieves the database entries with the task name as a retrieval key.

17. The data processing system according to claim 16, wherein the priorities designated at the priority storage areas are different between a plurality of database entries different in global task ID and identical in global task name.

18. A data processing system, comprising:
- a plurality of processors configured to execute a plurality of operating systems (OSs);
- a database having a plurality of database entries each defining a correspondence between a task and an attached OS,
- wherein said OSs are configured to operate a plurality of management programs,
- wherein the database entries respectively include areas which respectively store therein global task IDs for distinguishing a plurality of tasks of a plurality of OSs from one another respectively, global task names, attached OSs of the tasks, task IDs of the tasks allocated by the attached OSs, execution statuses of the tasks, and priorities of the tasks, each said database entry having distinct areas separately storing the global task ID and the global task name,
- wherein among a plurality of tasks specified within database entries different in global task ID and identical in global task name, a first task and a second task are different in attached OS,
- wherein when startup of a task is requested, the processor that executes one of the management programs retrieves a plurality of database entries corresponding to the requested task from the database, and
- wherein when tasks of the database entries selected by the retrieval are said first task and said second task, the processor that executes the one management program processes a task highest in priority within operable tasks under the control of the corresponding attached OS.

19. The data processing system according to claim 18, wherein the global task names correspond to task names, respectively, and said each processor that executes one or more of the management programs retrieves the database entries with the task name as a retrieval key.

20. The data processing system according to claim 19, wherein the priorities designated at the priority storage areas are different between a plurality of database entries different in global task ID and identical in global task name.

* * * * *